May 3, 1960
T. P. LEWIS
2,935,618
MEANS FOR POSITIONING STRUCTURAL MEMBERS ON A SPACING TABLE
Filed Jan. 14, 1957
5 Sheets-Sheet 1
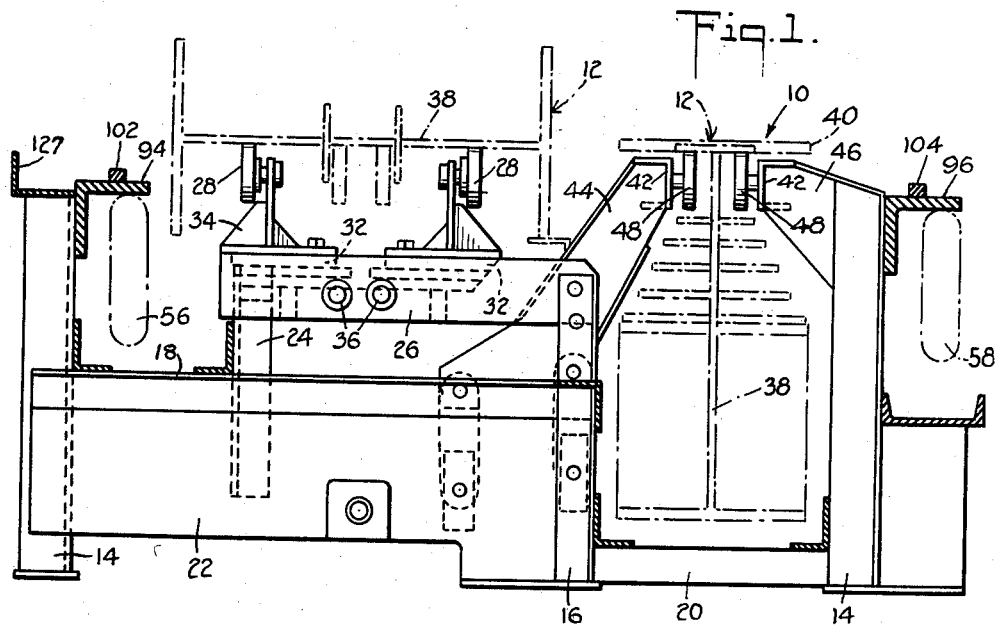
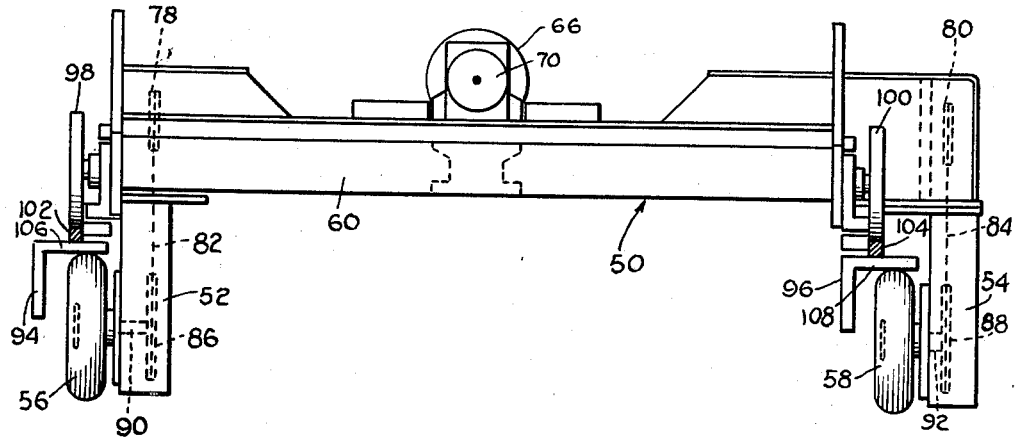
INVENTOR.
THOMAS P. LEWIS
BY Hubbell and Cohen
ATTORNEYS

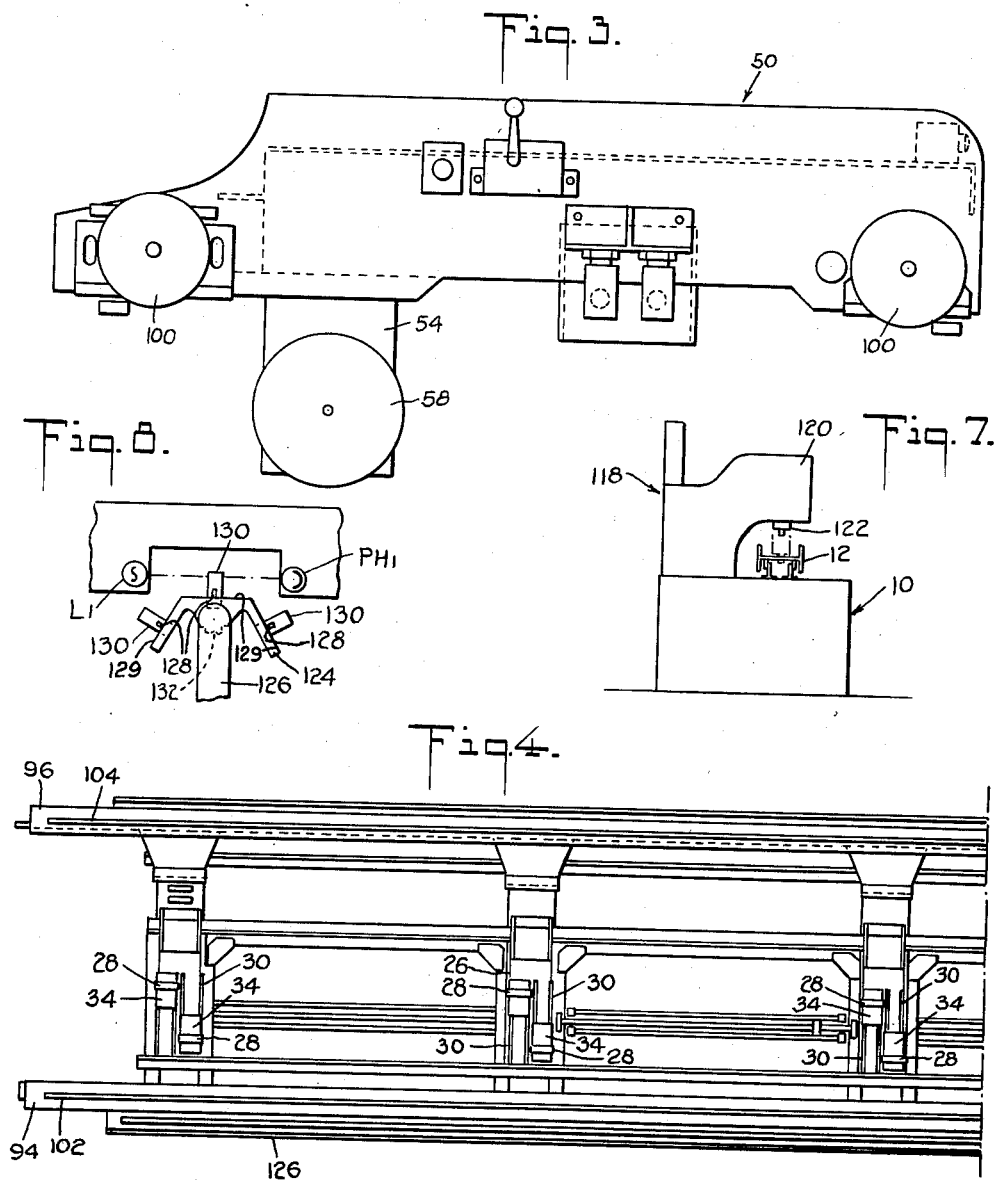

May 3, 1960
T. P. LEWIS
2,935,618
MEANS FOR POSITIONING STRUCTURAL
MEMBERS ON A SPACING TABLE
Filed Jan. 14, 1957
5 Sheets-Sheet 3
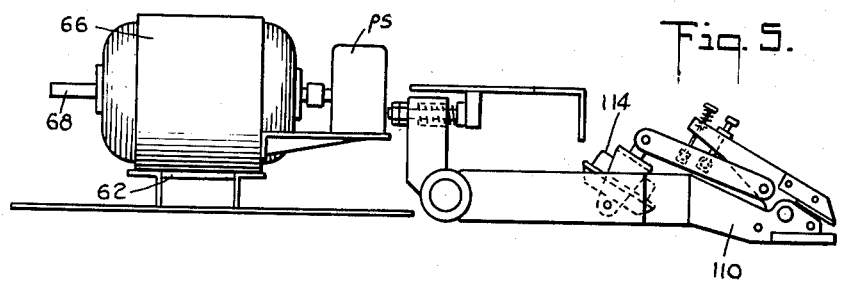
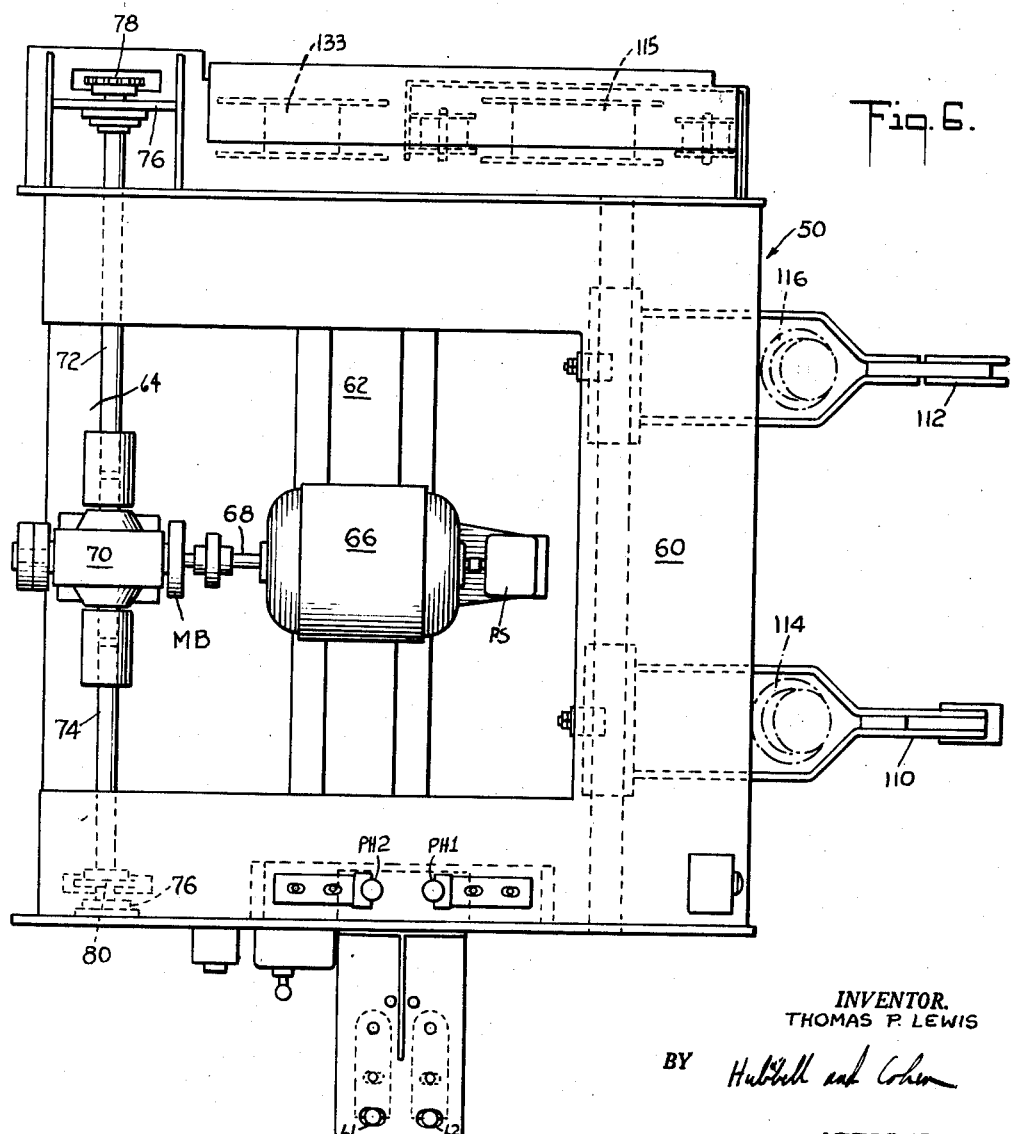
INVENTOR.
THOMAS P. LEWIS
BY Hubbell and Cohen
ATTORNEYS

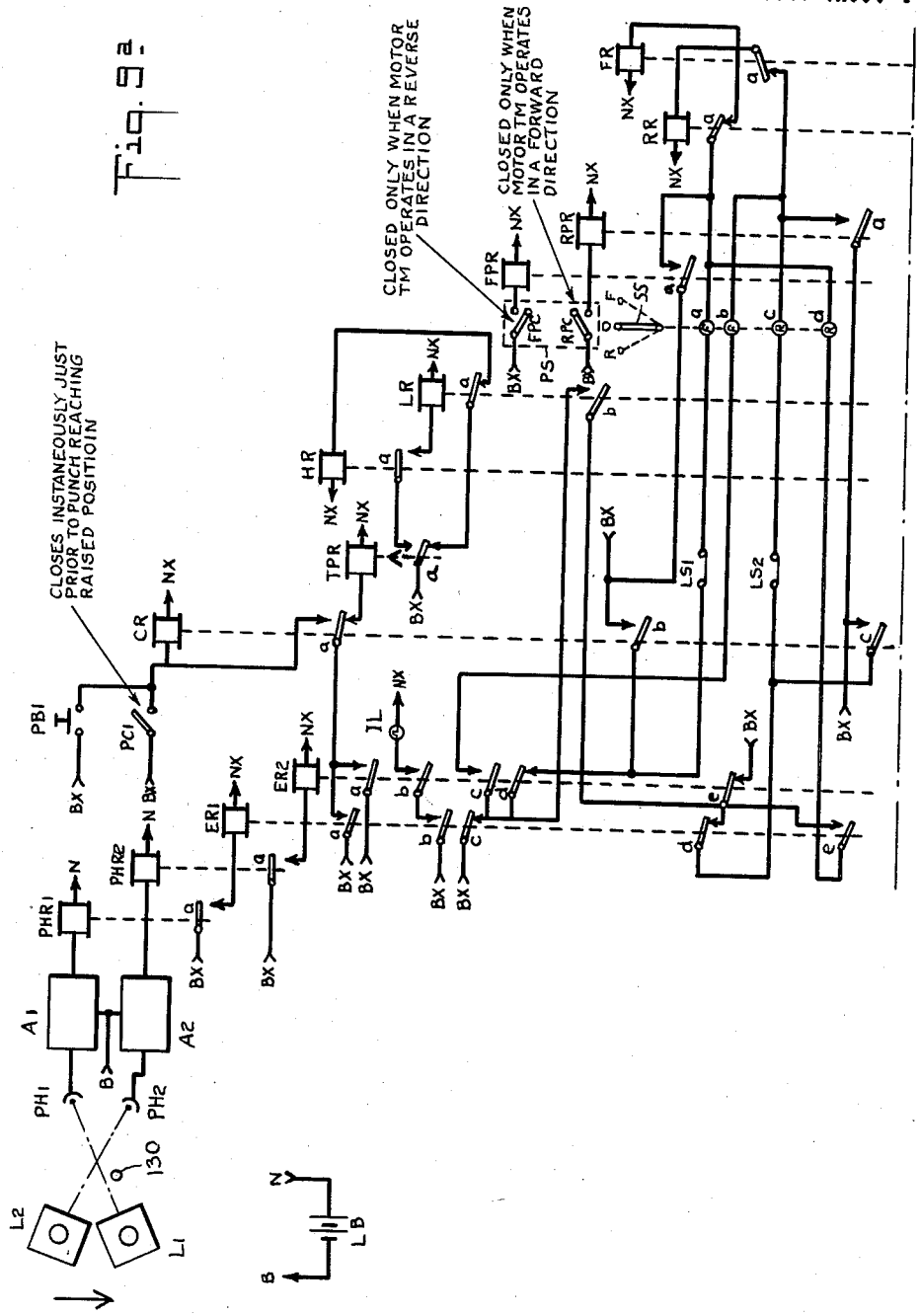

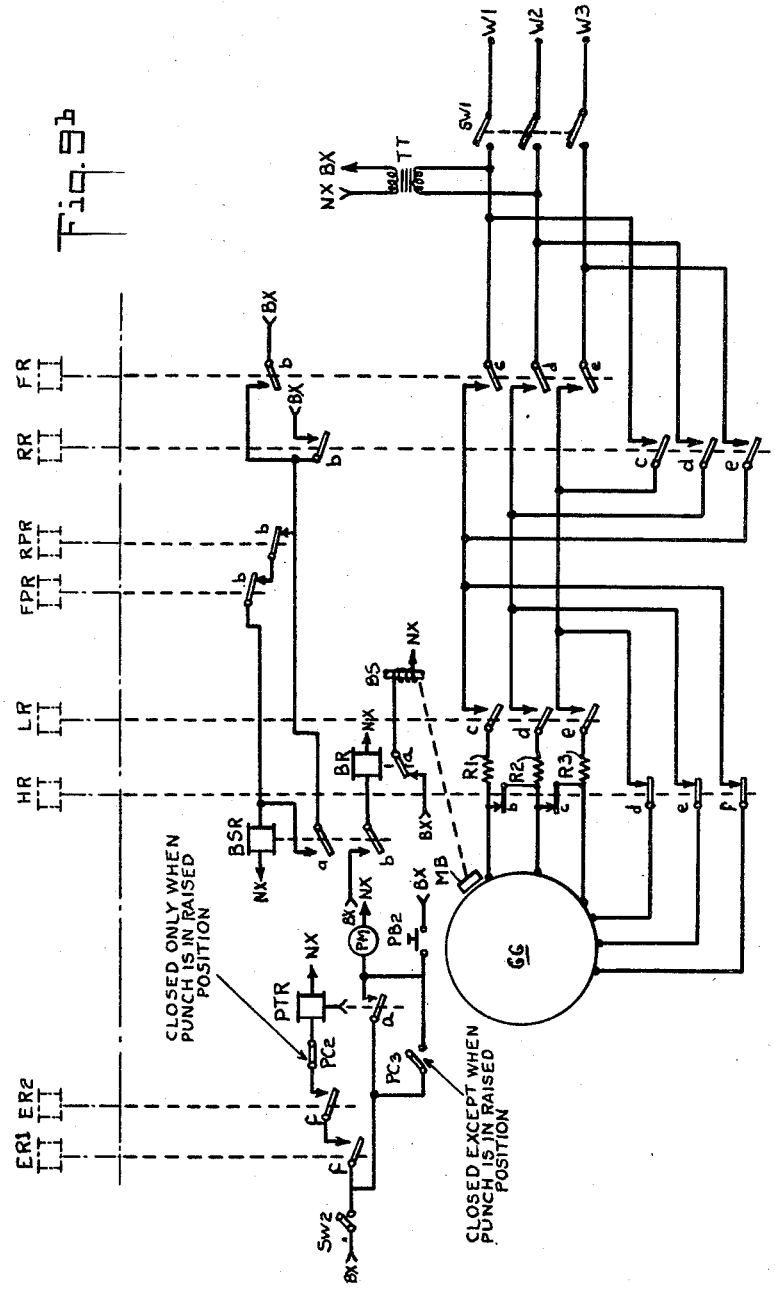

United States Patent Office 2,935,618
Patented May 3, 1960

2,935,618

MEANS FOR POSITIONING STRUCTURAL MEMBERS ON A SPACING TABLE

Thomas P. Lewis, North Apollo, Pa., assignor to Apollo Steel Company, Apollo, Pa., a corporation of Pennsylvania Application January 14, 1957, Serial No. 634,114

12 Claims. (Cl. 250—204)

This invention relates to means for positioning a movable object and particularly to means for positioning a structural element on a spacing table.

Although the present invention will be described in combination with a spacing table of relatively conventional design as may be found in many steel fabricating shops throughout the United States, it will be understood that the positioning means and other control apparatus associated therewith may be used in other applications and the present invention in no way should be construed as being limited only to use with spacing tables.

In steel fabricating shops where heavy structural members such as I-beams, channels, angle irons and so forth must be operated on to punch, burr, grind, etc. portions thereof, it has been standard practice for a number of years to use a spacing table which in effect is a means to movably support the structural member and to sequentially move said member past a machine which is to operate thereon. The operating machine may be a punch, a drill, a grinder or other type of machine found in steel fabricating shops. Since one of the major tasks in a steel fabricating shop is to prepare structural members for ready integration into steel works in the field, and since most of this preparation consists of punching and drilling the structural member at a number of points to adapt the structural member to receive rivets and bolts, it is necessary to move the structural member and stop it at various places where operations are to be performed. The positioning of the structural piece prior to each operation thereon must be held to relatively fine tolerances. Heretofore there have been a number of control means associated with spacing tables to effect this positioning. However, none of these means has proved wholly satisfactory due to great cost, inaccuracy of positioning, inconvenience in setting up the positioning means and proneness to failure.

It is therefore one object of the present invention to provide a new and improved means for positioning movable objects.

Another object of the present invention is the provision of new and improved means for positioning structural members on spacing tables.

A further object of the present invention is the provision of new and improved photoelectric means for positioning structural members on spacing tables.

Yet a further object of the present invention is the provision of improved circuit means for controlling the operation of a motor for moving a structural member on a spacing table.

Yet a further object of the present invention is the provision of new and improved automatic control means for a spacing table and for a machine cooperating therewith for positioning a structural member on the spacing table and thereafter actuating said associated machine to operate on the positioned structural member.

The above and other objects, characteristics and features of the present invention will be more fully understood from the following description taken in connection with the accompanying illustrative drawings.

In the drawings:

Fig. 1 is a transverse sectional view of a spacing table;

Fig. 2 is an end elevational view of a carriage which may be movably positioned on the spacing table shown in Fig. 1;

Fig. 3 is a side elevational view of the carriage shown in Fig. 2;

Fig. 4 is a plan view of the spacing table shown in Fig. 1;

Fig. 5 is a side elevational view of a portion of the carriage;

Fig. 6 is an enlarged top plan view of the carriage;

Fig. 7 is an end elevational view of the spacing table shown in Figs. 1 and 4 in combination with a punch cooperating therewith;

Fig. 8 is a fragmentary elevational view illustrating some of the details of construction of the positioning means embodying the present invention; and Figs. 9a and 9b when placed one above the other with Fig. 9a on top, together diagrammatically illustrate the circuit controlling means for the carriage and punch illustrated in Fig. 7.

Referring now to the drawings in detail and particularly to Figs. 1 and 4, the spacing table 10 is adapted to support structural members 12 for movement of the structural members in a longitudinal direction. The spacing table comprises a plurality of pairs of vertical side supports 14 and a plurality of intermediate vertical supports 16. The side supports are connected to the vertical supports by horizontal structural members such as channels 18 and plates 20. A large plate 22 also extends between the left hand end support 14 and intermediate support 16 and is reinforced by the horizontal channel 18. Secured to each channel 18 and plate 22 is a vertical channel 24. Extending between each vertical channel 24 and each intermediate support 16 are pairs of horizontal channel members 26 which support adjustable rollers 28 in a manner to be described below. The channels 26 are grooved as at 30 and guide flanges 32 for roller supports 34 travel through said grooves. It is to be noted from Fig. 4 that the rollers 28 and the grooves 30 are offset whereby to prevent interference between the roller supports 34 in order to permit the rollers 28 to be moved from their spaced apart positions shown in solid lines in Fig. 1 to their relatively close together positions as shown in dotted lines in Fig. 1. To position the rollers 28, gears 36 may be mounted on channels 26 to engage the bottoms of the roller supports 34 and to give lateral movement thereto. The lateral adjustment of the rollers 28 is provided to adapt the spacing table for use with structural members 12 of varying widths. When a large structural member 12 is used, the rollers 28 are widely spaced apart and when a narrow structural member is used the rollers 28 are placed relatively close together as shown in dotted lines in Fig. 1.

The rollers 28 are used to movably mount structural members 12 when work is to be performed on the webs 38 of the structural member 12. When it is desired to work on the flanges 40 of a structural member, a separate and distinct support means is provided. This support means comprises two closely spaced longitudinally extending angle irons 42 which are supported by brackets 44 and 46 which are respectively connected to intermediate vertical supports 16 and the right hand end vertical supports 14. Rotatably mounted on the angle irons 42 are rollers 48 which are closely spaced apart. The flange 40 of the structural member 12 is movably positioned on the rollers 48 and the web 38 of the structural member 12 depends therefrom. Since the rollers 48 are disposed a substantial distance upward from the cross members 20, a plurality of different sizes of structural members 12 may be accommodated for support by the rollers 48 as shown in dotted lines in Fig. 1.

To effect movement of the structural members 12 on the spacing table 10, a carriage 50 is employed. Referring to Figs. 2, 3 and 6, the carriage 50 comprises side members 52 and 54 which support drive wheels 56 and 58, respectively. The side members 52 and 54 are rigidly operatively connected by transverse support members 60, 62 and 64 which also act as support means for various elements on the carriage. Particularly, if desired, a plate may overlie the transverse structural members 60, 62 and 64, thereby providing a platform.

Supported on the carriage 50 is an electric motor 66 having an output shaft 68 which is connected to a speed reduction gear unit 70. The speed reduction gear unit 70 has two output shafts 72 and 74 which run transversely of the carriage and substantially the full width thereof. The shafts 72 and 74 are journalled in suitable bearing plates 76 at the sides of the carriage. Fixed to each shaft 72 and 74 adjacent the ends thereof are sprockets 78 and 80. Each sprocket 78 and 80 is in operative relationship with a chain 82 and 84, respectively, which also engage sprockets 86 and 88, respectively. Sprocket 86 is fixed to rotatable shaft 90 on which wheel 56 is also fixed. Sprocket 88 is fixed to a shaft 92 on which wheel 58 is also fixed. Accordingly, when motor 66 is actuated to rotate its output shaft 68, shafts 72 and 74 are rotated through a gear reduction unit 70 to thereby impart rotary movement to sprockets 78 and 80 whereby to impart linear movement to chains 82 and 84 to thereby rotate sprockets 86 and 88 and thus impart rotary movement to drive wheels 56 and 58. Also rotatably mounted on the side members of the carriage 50 are pressure rollers 98 and 100.

Fixed to the left hand vertical support 14 is an angle iron 94 which runs longitudinally of the entire spacing table. Fixed to the right hand vertical support 14 is an angle iron 96 which also extends longitudinally of the entire length of the table. The carriage 50 is movably mounted on the spacing table 10 by placing the pressure rollers 98 and 100 in frictional engagement with hard steel bearing strips 102 and 104, respectively, which are fixed to the horizontal portions 106 and 108 of angle irons 94 and 96, respectively. By so positioning the clamping rollers on the bearing strips, the drive rollers 56 and 58 are brought into frictional engagement with the under surface of the horizontal portions 106 and 108 of angle irons 94 and 96. Accordingly, when the drive rollers 56 and 58 are rotated in the manner described above, they impart linear movement to the carriage as will be apparent from a perusal of Figs. 1 and 2.

Referring now to Figs. 5 and 6, means are provided on the carriage 50 for gripping the structural members 12 to pull them along behind the carriage as the carriage moves along the spacing table. This means includes a toggle clamp 110 and a toggle clamp 112 which are actuated by air cylinders 114 and 116 to open and close the jaws of the clamps. The clamp 110 is used to grip a structural member when the web thereof is to be operated on, that is when the web thereof is resting on the rollers 28. The other toggle clamp 112 is used to grip the flange of a structural member 12 when the flange thereof is to be operated on, that is when the flange thereof is resting on the rollers 48. Compressed air is supplied to cylinders 114 and 116 by an air hose (not shown) which is connected to a compressor and which is taken up and unreeled from a reel 115 mounted on carriage 50. The clamping mechanism is of conventional design, well known to those skilled in the art.

From the above description it will be seen that the spacing table comprises a plurality of sets of rollers which movably mount a structural member thereon either resting on the flange or resting on the web. Moreover, movably mounted on the spacing table is the carriage 50 which is provided with means to clamp or grip the structural member. The carriage is provided with motor means to move it along the table whereby to pull the structural member along the table.

Referring now to Fig. 7, the spacing table 10 is shown cooperating with a punch machine 118 having a horizontal arm 120 which extends outwardly over the spacing table 10. Of course, other operating machines such as a drill press, a grinder, etc., may be used in lieu of punch machine 118. Carried by the arm 120 and adjustably positioned longitudinally thereof is a punch 122 which may be operated from the raised position shown in solid lines in Fig. 7 to a lowered or operated position shown in dotted lines in Fig. 7. In moving from the raised to the lowered position, the punch 122 punches a hole in the structural member 12 being carried on the spacing table 10.

The present invention is directed to a means for positioning the structural member 12 sequentially at a plurality of spaced points whereby to permit the punch machine 118 to operate and punch holes in the structural member 12 at desired points. A portion of the apparatus achieving this positioning is carried by the carriage 50 and another portion thereof is carried by the spacing table 10. Referring now to Fig. 8, the portion of the positioning means carried by the spacing table 10 comprises a pin support 124 pivotally mounted on upstanding brackets 126 which are fixed to a longitudinal angle 127 attached to one of the side supports 14, here shown as the left hand side support. The pin support as shown herein has three facets or surfaces 129 although any number from one on up may be used. Each of the facets is provided with a plurality of surface discontinuities such as indentations or apertures which are adapted to removably hold pins 130. As presently preferred, ridges or shoulders 128 are amployed to releasably hold pins 130, a releasable interengagement being all that is required. Each pin represents a point at which the carriage is to stop in order to permit the punch machine 118 or some other machine to operate on the structural member 12 being pulled by the carriage 50. It is presently preferred to employ a multi-facet pin support 124 as shown in Fig. 8 because it enables a number of longitudinal movements of a structural member 12 to be set up in advance. When the structural member is first moved down the table, one of the facets 129 is in the horizontal position. When it is moved down the table a second time, a second of the facets may be in the horizontal position, and when it is moved down a third time, the third facet is in the horizontal position, etc. The pins carried by the facet in the horizontal position determine the positions at which the carriage stops moving, the other pins being out of operative relationship at the time. The pin support 124 may be releasably held in any of its positions by suitable detent means 132.

Cooperating with the pins 130 are a pair of photocell units which together comprise means for detecting the presence of a pin. In accordance with the present invention, the light beams emanating from a pair of lamps L1 and L2 carried by carriage 50 are directed at an associated pair of photocells PH1 and PH2 also carried by carriage 50. It has been found that by using angularly related intersecting light beams the spacing of the light beams at their points of intersection with the pins 130 can be conveniently achieved. However, if the lamps L1 and L2 and the photocells PH1 and PH2 are sufficiently small to enable them to be closely positioned, the light beams may be parallel. The manner in which the photocells PH1 and PH2 control the operation of the carriage motor 66 will be described hereinafter.

The photocells as was stated above are carried by the carriage 50 as shown in Fig. 6. Also carried by the carriage 50 for controlling the motor 66 is an electric brake MB of standard design obtainable on the open market and a conventional plugging switch PS the operation of which will be described hereinafter.

In addition to the apparatus described above which is carried by the carriage 50, various control relays and associated apparatus are also mounted on the carriage.

The movable carriage is driven by the motor 66 which is a three-phase, one-winding, two-speed motor available on the open market. The speed of the motor 66 is controlled by a high speed relay HR and a low speed relay LR, the relay LR working in conjunction with three resistors, R1, R2 and R3 to cause the motor 66 to operate at low speed, as will be described more clearly hereinafter. The direction of rotation of the motor 66 is controlled by two relays RR and FR. Brake MB is provided to cause the motor 66 to stop and stay stopped when desired. The brake MB is controlled by a solenoid BS which in turn is controlled by a brake relay BR. Brake relay BR is controlled by a brake stick relay BSR. The brake stick relay is controlled by the directional relays FR and RR and by two plugging relays FPR and RPR. The plugging relays FPR and RPR operate to plug the motor whereby to rapidly bring it to a halt when the carriage is closed to the point of proper positioning. The plugging relays FPR and RPR are controlled by the plugging switch PS which is available on the open market. The plugging switch is carried by the shaft of the motor 66 and has two contacts FPC and RPC which are operated by a rotational responsive mechanism to be closed or opened in accordance with the direction of rotation of the motor 66. As shown herein, the contact FPC which controls the forward plug relay FPR is closed only when the motor 66 operates in a reverse direction and above a given rotational speed. The reverse plug contact RPC of the plug switch PS controls the reverse plug relay RPR. The reverse plug contact RPC is closed only when the motor 66 operates in a forward direction above a certain rotational speed. The relays FR and RR are controlled in part by a three-position switch SS having a reverse or "R" position, an off or "O" position, and a forward or "F" position. The switch SS has a plurality of contacts shown as circles which are closed when the switch is in the position designated in the circle, for instance, a circle with an "F" in it designates a contact closed when the switch is in the "F" position. This contact is opened when the switch is in any other position. To prevent the movement of the spacing table beyond its two extreme positions, two limit switches LS1 and LS2 are provided. The limit switch LS1 is closed except when the spacing table is in its extreme position to which it would be moved by forward movement of the motor 66. The limit switch LS2 is closed except when the spacing table is in the position to which it would be moved by reverse operation of the motor 66. Both of these switches are closed in all other positions of the spacing table. Also controlling the relays FR and RR is a control relay CR. The relay CR is controlled by a manually operable switch button PB1. If desired, the control relay CR may also be controlled by a contact PC1 which is operated by the punch so that it is normally open but it closes for a very brief time just prior to the punch reaching its normal, non-operated or raised position. The reason for this will become clear hereinafter. Control relay CR partially controls a slow pick-up timing relay TPR which in turn partially controls the speed control relay LR and HR. Relay TPR is also controlled by two relays ER1 and ER2. Relay ER1 is controlled by a relay PHR1 which is in turn controlled by photocell PH1 through an amplifier A1. The photocell PH1 operates in conjunction with light source L1. The relay ER2 is controlled by a relay PHR2 which is in turn controlled by photocell PH2 through an amplifier A2. The photocell PH2 is actuated by the second light source L2.

As shown herein, the amplifiers A1 and A2 are energized by a suitable direct current source such as a battery LB having a positive terminal B and a negative terminal N. The motor 66 is supplied with power from a three-phase source having line wires W1, W2 and W3. The three-phase source is controlled by a line switch SW1. The energy for the remaining parts of the control system is supplied from one of the phases of the three-phase source through a step down transformer TT having one terminal BX and another terminal NX.

In addition to the apparatus hereinbefore mentioned, additional apparatus may be included for controlling a motor PM which operates the punch machine 118. This additional apparatus includes a slow pick-up relay PTR which is controlled by a contact PC2 and by the relays ER1 and ER2. The contact PC2 is controlled by the punch or the punch motor and is closed only when the punch is in its raised, non-operated or normal position. Punch motor PM is also controlled by another contact PC3 which is normally closed but which is open when the punch is in its raised or normal position. This additional equipment can be switched into or out of circuit by means of a control switch SW2. When the switch SW2 is open, then the punch motor may be controlled by a normally open manually operable switch PB2. The line wires and any control wires extending between the carriage and the punch machine may be conveniently reeled onto and off of a reel 133 mounted on carriage 50.

Referring to Figs. 9a and 9b, the path of movement of the carriage is illustrated by an arrow in Fig. 9a. It will be seen that the path of movement of the carriage causes each pin 130 in turn to intersect the light beams from the light sources L1 and L2. Moreover, the points of intersection of the indexing pin 130 with the light beams from the light sources L1 and L2 are spaced closer together than the dimension of each pin 130 in the direction of movement of the carriage whereby to permit the pin 130 to simultaneously block both light beams. In order to conveniently accomplish this spacing of the points of intersection of the light beams with the path of movement of the pin 130, it is presently preferred to have the light beams intersect. Of course, the light beams can be parallel if they can be conveniently arranged and the provision of intersecting light beams is merely as a matter of convenience to achieve the proper spacing of the points of intersection of the light beams with the path of movement.

With the light beams unblocked as shown in the drawing, the photocell PH1 is actuated to supply energy to an amplifier A1 wherein said energy is amplified and supplied to the photocell repeater relay PHR2 which is thereby energized and picked up. Relay ER1 is a reverse repeater relay of the relay PHR1. Its energizing circuit includes a back contact a of the relay PHR1. Accordingly, in the normal condition as shown in the drawing, relay ER1 is deenergized since back contact a of relay PHR1 is open. Relay ER2 is a reverse repeater relay of photocell repeater relay PHR2. The energizing circuit for relay ER2 may be traced from terminal BX, over back contact a of relay PHR2 through the winding of relay ER2 to terminal NX. Accordingly, in the normal condition with relay PHR2 energized, relay ER2 is deenergized. As stated hereinbefore, relay CR is controlled by a manually operable push button PB1 and by a punch control contact PC1. One energizing circuit for relay CR may be traced from terminal BX, through push button PB1 and the winding of relay CR to terminal NX. The second energizing circuit for relay CR may be traced from terminal BX, over contact PC1 and the winding of relay CR to terminal NX. Relay CR is also provided with a stick circuit which may be traced from terminal BX, over front contact *a* of relay ER1 in multiple with front contact *a* of relay ER2, front contact *a* of relay CR and the winding of relay CR to terminal NX. Slow pick-up relay TPR has an energizing circuit which may be traced as follows: from terminal BX, over front contact *a* of relay ER1 in multiple with front contact *a* of relay ER2, back contact *a* of relay CR and the winding of relay TPR to terminal NX. High speed control relay HR has an energizing circuit which may be traced from terminal BX over back contact *a* of relay TPR, back contact *a* of relay LR, and the winding of relay HR to terminal NX. Low speed control relay LR has an energizing circuit which may be traced from terminal BX, over front contact *a* of relay TPR, front contact *a* of relay HR and the winding of relay LR to terminal NX. Since both relays LR and HR are energized over each other's back contact, it will be seen that they are electrically interlocked and cannot both be energized at the same time.

Forward control relay FR has a main energizing circuit which may be traced from terminal BX, over back contact *c* of relay ER1, back contact *d* of relay ER2, the contact of limit switch LS1, contact *a* of selector switch SS which is closed in the forward or "F" position of the selector switch, back contact *a* of relay RR, and the winding of relay FR to terminal NX. Relay FR has a second energizing circuit which may be traced from terminal BX, over back contact *e* of relay ER2, front contact *e* of relay ER1, contact *d* of selector switch SS closed in the reverse or "R" position of the selector switch, back contact *a* of relay RR and the winding of relay FR to terminal NX. A third energizing circuit for relay FR may be traced from terminal BX over front contact *b* of relay CR, the contact of limit switch LS1, contact *a* of selector switch SS closed in the forward position of the selector switch, back contact *a* of relay RR, and the winding of relay FR to terminal NX. A fourth energizing circuit for relay FR may be traced from terminal BX, over front contact *a* of plugging relay FPR, back contact *a* of relay RR and the winding of relay FR to terminal NX. A fifth energizing circuit for relay FR may be traced from the terminal BX, over back contact *e* of relay ER2, front contact *b* of relay LR, back contact *d* of relay ER2, the contact of limit switch LS1, contact *a* of switch SS, back contact *a* of relay RR and the winding of relay FR to terminal NX.

A first energizing circuit for the reverse direction control relay RR may be traced from terminal BX, over back contact *e* of relay ER2, back contact *d* of relay ER1, the contact of limit switch LS2, contact *c* of switch SS which is closed in the reverse or "R" position, back contact *a* of relay FR and the winding of relay RR to terminal NX. A second energizing circuit for relay RR may be traced from terminal BX over front contact *a* of relay RPR, back contact *a* of relay FR and the winding of relay RR to terminal NX. A third energizing circuit for relay RR may be traced from terminal BX over front contact *c* of relay CR, the contact of limit switch LS2, contact *c* of switch SS, back contact *a* of relay FR, and the winding of relay RR to terminal NX. A fourth energizing circuit for relay RR may be traced from terminal BX over back contact *c* of relay ER1, front contact *c* of relay ER2, contact *b* of switch SS, back contact *a* of relay FR and the winding of relay RR to terminal NX.

It is to be noted that all of the energizing circuits for relay FR include back contact *a* of relay RR and all of the energizing circuits for relay RR include back contact *a* of relay FR. Accordingly, relays RR and FR are electrically interlocked and both cannot be energized simultaneously.

Relays FR, RR, HR and LR cooperate to control motor 66 which moves the carriage longitudinally of the spacing table. The power supply for motor 66 as shown herein is a three-phase supply including three line wires W1—W2—W3 which are connected into the motor circuit through a three-blade switch SW1. As is well known to those skilled in the art, the direction of rotation of a three-phase motor can be reversed by reversing the connections to any two of the phases of a three-phase supply. Moreover, motor 66 is a two-speed motor, the speed being controlled by controlling the number of poles being energized at any one time. As shown herein, two different voltages are supplied to the motor 66, one being the full line voltage of the three-phase supply, and the other being the lower voltage which is diminished by the interposition of resistors R1, R2 and R3 in the supply circuit. On high speed operation the number of poles is halved by closing contacts *b* and *c* or relay HR and thus double the speed of motor operation. The direction of rotation of motor 66 may readily be reversed by merely reversing the connections to any two of the three phases, as is true with any standard three-phase motor. It will be understood that other means for regulating the speed of motor 66 may be employed. The energizing circuits for the motor 66 are arranged so that when relays FR and HR are both energized (and relays RR and LR are deenergized) the full line voltage in a given phase sequence is supplied to three poles of motor 66 whereby to cause it to rotate in a given direction at full speed. When relays FR and LR are both energized (and relays RR and HR are deenergized) then energy is supplied to motor 66 in said given phase sequence but through the resistors R1, R2 and R3 to all six poles whereby to cause the motor 66 to operate at a lower forward speed. With relays RR and HR energized (and relays FR and LR deenergized), three poles of motor 66 are supplied with energy at full line voltage but the phase sequence is reversed whereby to cause the motor 66 to rotate at full or normal speed in the reverse direction. With relays RR and LR energized (and relays FR and HR deenergized), all six poles of motor 66 are supplied with energy in reversed phase sequence and at low voltage whereby to cause the motor to rotate in a reverse direction at low speed.

Motor 66 is also provided with a suitable brake designated herein as MB. The brake MB operates to prevent the rotation of motor 66 at given times. Brake MB is actuated by a solenoid BS which is controlled by a relay BR. Relay BR is in turn energized over back contact *b* of a stick relay BSR. Relay BSR has a first energizing circuit which may be traced from terminal BX, over front contact *b* of relay FR, back contact *b* of relay RPR, back contact *b* of relay FPR and the winding of relay BSR to terminal NX. The second energizing circuit for relay BSR may be traced from terminal BX over front contact *b* of relay RR, back contact *b* of relay RPR, back contact *b* of relay FPR, and the winding of relay BSR to terminal NX. Front contact *a* of relay BSR by-passes back contacts *b* of relays RPR and FPR whereby to hold relay BSR energized independently of these contacts. The solenoid BS is provided with an energizing circuit which may be traced from terminal BX, over back contact *a* of relay BR, and the winding of solenoid BS to terminal NX. Through linkage connecting solenoid BS to brake MB, the brake is operated to prevent rotation of motor 66 when solenoid BS is energized.

If desired, the punch motor PM may be operated automatically in timed relationship with the operation of the spacing table. Moreover, if desired, the punch motor may be operated manually by a push button contact PB2. If it is desired to effect automatic operation of motor PM, switch SW2 is closed whereby to include in the control circuit for motor PM, relays ER1, ER2 and PTR and contacts PC2 and PC3. If it is desired to manually operate motor PM, then switch SW2 may be left open. The manually controlled energizing circuit for punch motor PM may be traced from terminal BX over the contact of push button switch PB2 and the winding of motor PM to terminal NX. Motor PM is provided with two energizing circuits when it is automatically controlled. The first of these energizing circuits may be traced from terminal BX, over switch SW2, front contact *a* of relay PTR and the winding of motor PM to terminal NX. The second energizing circuit for motor PM may be traced from terminal BX over switch SW2, contact PC3 which is closed except when the punch is in its raised, non-operated or normal position, and the winding of motor PM to terminal NX. Relay PTR is provided with an energizing circuit which may be traced from terminal BX over switch SW2, front contact *f* of relay ER1, front contact *f* of relay ER2, cam actuated contact PC2 which is closed only when the punch is in its raised or normal position, and the winding of relay PTR to terminal NX.

The power supply for the major portion of the control circuit is supplied from one phase of the three-phase supply W1—W2—W3. As shown herein, the input side of a transformer TT is connected to one phase of the motor power supply, preferably on the load side of switch SW1. The output terminals of transformer TT are designated BX and NX which are the terminals supplying the bulk of the control equipment shown herein.

In the normal condition of the control apparatus, switch SW1 is closed and indexing pins 130 are not blocking the light beams L1 and L2. Punch 122 is in its raised or non-operated position and directional selector switch SS is in its off or "O" position. Under these conditions the control system assumes the following condition. Light beam L1 actuates photocell PH1 which puts out a signal amplified by amplifier A1 to thereby energize relay PHR1 and cause that relay to be picked up. Moreover, the light beam emanating from the light source L2 falls upon photocell PH2 and causes it to put out a signal which is amplified by amplifier A2 and supplied to relay PHR2 whereby to energize that relay and cause it to be picked up. With relay PHR1 energized and picked up, relay ER1 is deenergized and with relay PHR2 picked up, relay ER2 is deenergized. With relays ER1 and ER2 deenergized, relay TPR is deenergized. Moreover, with the punch in its raised position, contact PC1 will be open, push button switch PB1 is not actuated at this time and, accordingly, relay CR is deenergized and released. With relay TPR deenergized, relay HR is energized over its energizing circuit including back contact *a* of relay TPR and back contact *a* of relay LR. Moreover, relay LR is deenergized due to the fact that relay TPR is deenergized and relay HR is therefore energized. Indicating lamp IL is dark since relays ER1 and ER2 are deenergized. Since relays ER1 and ER2 are deenergized and selector switch SS is in its "O" position, relays FR and RR will be deenergized whereby motor 66 is deenergized. Accordingly, motor 66 is not rotating. Therefore, plug-switch contacts FPC and RPC are open and relays FPR and RPR are released. However, with relays RR and FR both released as described above, the energizing circuit for relay BSR is open and relay BSR is released. Therefore, relay BR is deenergized and released. With relay BR released, solenoid BS is energized over back contact *a* of relay BR whereby to actuate the brake MB to hold motor 66 stationary. Therefore, carriage 50 is at rest.

Assuming now that selector switch SS is operated to its forward or "F" position, relay FR becomes energized over its previously traced first energizing circuit which may be retraced from terminal BX, over back contact *c* of relay ER1, back contact *d* of relay ER2, the contact of limit switch LS1, contact *a* of switch SS, back contact *a* of relay RR, and the winding of relay FR to terminal NX. Accordingly, relay FR picks up and energizes motor 66 with full line voltage and in the forward phase sequence. Each phase for motor 66 is supplied over a front contact of relay FR which is now energized and over a front contact of relay HR which is also energized. Upon relay FR picking up, the energizing circuit for relay BSR becomes established and thus picks up whereby to close the energizing circuit for relay BR. Accordingly, relay BR picks up and opens the energizing circuit for solenoid BS whereby to cause the solenoid to operate and release the brake MB to free motor 66 for rotation. Moreover, when relay BSR picks up, it establishes its own stick circuit whereby to maintain itself energized regardless of the condition of relays FPR and RPR. Therefore, brake MB stays released regardless of the operation of plugging switch PS. Motor 66 therefore commences rotating in its forward direction to move the carriage. With motor 66 rotating in the forward direction, plug switch PS operates to close contact RPC whereby to energize relay RPR. With relay FR energized but relay RPR also energized, relay BSR remains energized over its stick circuit and the brake MB will remain released as stated above. Moreover, with relay FR energized, no energizing circuit can now be closed for relay RR. Therefore, motor 66 will continue to rotate until a pin 130 intersects the light beam emanating from source L1 at which time photocell PH1 will discontinue putting out a signal whereby to cause the deenergization of relay PHR1. With relay PHR1 deenergized, its back contact *a* becomes closed to energize relay ER1 which will pick up. As soon as relay ER1 picks up, an energizing circuit for relay TPR becomes closed, said energizing circuit including front contact *a* of relay ER1 and back contact *a* of relay CR. However, relay TPR does not immediately pick up because of its slow pick up characteristic and, accordingly, it remains released for a predetermined time interval.

Moreover, with relay ER1 picked up, the last traced energizing circuit for relay FR becomes open at back contact *c* of relay ER1 whereby to cause relay FR to release. Upon the release of relay FR, an energizing circuit is closed for relay RR which circuit may be traced from terminal BX over front contact *a* of relay RPR, back contact *a* of relay FR and the winding of relay RR to terminal NX. Relay RR will therefore pick up and will cause energy to be supplied to motor 66 in reverse phase sequence at full voltage whereby to fully plug the motor 66 in an attempt to stop it. Moreover, with relay FR released, the stick circuit for relay BSR becomes open and relay BSR releases whereby to close the energizing circuit for relay BR. Accordingly, relay BR picks up and energizes solenoid BS whereby to apply brake MB in a further attempt to stop motor 66. However, the inertia of the system is such that motor 66 though rapidly slowing down in the forward direction continues to operate in that direction for a short time interval whereby to permit the continuance of the movement of the carriage in the forward direction.

The full plugging of motor 66 continues until motor 66 comes almost to a standstill at which time contact RPC, of plugging switch, opens and deenergizes relay RPR. It is assumed that the carriage will have traveled a short distance from the position at which the light beam L1 was intersected but not far enough to intersect the light beam L2. After the expiration of the predetermined time interval for the picking up of slow acting relay TPR, that relay picks up and thereby deenergizes relay HR. When relay HR becomes deenergized, the energizing circuit for relay LR becomes closed over front contact *a* of relay TPR and back contact *a* of relay HR.

Motor 66 will thus again start rotating in the forward position but at a reduced speed until light beam L2 is intersected by pin 130 at which time motor 66 will come to a halt and brake MB will set. When this occurs all the energizing circuits for relays FR and RR will be open since relays ER1 and ER2 will both be energized and relays FPR and RPR will be deenergized due to the fact that both plugging contacts FPC and RPC are open when the motor is not rotating. Accordingly, with the motor stopped and relays FR and RR deenergized, the carriage will come to a rest with the pin 130 blocking both light beams. Moreover, indicating lamp IL will be lighted to indicate the proper positioning of the structural member. Therefore, the structural member carried by the carriage is properly positioned and the punch motor can be operated either manually as by operating push button switch PB2 or automatically.

The automatic operation of punch motor PM is effected when switch SW2 is closed. When the switch is closed and when both relays ER1 and ER2 are picked up due to the simultaneous blocking of the two light beams by the pin 130, relay PTR becomes energized over its energizing circuit. However, relay PTR does not immediately pick up to energize punch motor PM due to the slow pick up characteristic of the relay. This eliminates the possible actuation of the punch motor PM prior to a stable positioning of the pin 130 as might occur if the system hunted or oscillated in a manner to be described hereinafter. However, after the expiration of the slow pick up time interval, relay PTR picks up to close the energizing circuit for motor PM including front contact a of relay PTR. Therefore, motor PM operates to start moving the punch 122 downward to punch the beam or structural member. As soon as the punch motor starts to move the punch downward, contact PC3 becomes closed whereby to provide an alternate energizing circuit for motor PM to continue the operation of the punch. Shortly thereafter, contact PC2 opens to deenergize relay PTR. The punch continues to operate downwardly to punch the structural member and thereafter commences moving upwardly. As it returns to its raised or normal position, contact PC3 opens whereby to deenergize the motor PM and discontinue the operation of the punch. At the same time contact PC2 closes but relay PTR does not pick up due to its slow pick up characteristic. Moreover, and as will be described immediately below, prior to relay PTR picking up, motor TM becomes reenergized to move the carriage so as to unblock the light beams whereby to open the energizing circuit for relay PTR before it has a chance to pick up and reactuate the punch, thereby preventing a second operation of the punch.

Regardless of whether the punch motor is manually actuated or automatically actuated, just prior to the punch returning to its raised position the contact PC1 becomes closed for a brief time interval. Upon the contact PC1 becoming closed, relay CR becomes energized and picks up. With relay CR picked up, an energizing circuit is closed for relay FR, which circuit may be traced from terminal BX, over front contact b of relay CR, limit switch LS1, contact a of switch SS, back contact a of relay RR and the winding of relay FR to terminal NX. Accordingly, relay FR will pick up. Moreover, with relay CR picked up, relay TPR becomes deenergized and releases whereby to reclose the energizing circuit for relay HR. With relays FR and HR picked up, motor 66 is energized at full voltage in forward phase sequence. Moreover, with relay FR picked up, relay BSR picks up and sticks in its energized condition. Accordingly, relay BR becomes deenergized and releases to energize solenoid BS and thereby release brake MB. Accordingly, motor 66 rotates in the forward direction to move carriage 50 away from one pin 130 and toward the next pin 130. Relay CR remains picked up during this time even though the punch contact PC1 is open due to the fact that the stick circuit for relay CR including front contact a of relay ER2 is now closed. After the carriage moves to clear the two light beams, the above mentioned stick circuit for relay CR becomes open and relay CR releases whereby to restore the system to its initial condition as described above. Accordingly, the cycle has been described once through and continues to repeat for each pin carried by the pin support table until the spacing table has moved to its extreme position at which time the limit switch LS1 becomes open. At that time subsequent forward movement of the spacing table is prevented.

Anyone skilled in the art will know from a study of the diagram of the control apparatus that the control apparatus is symmetrical with regard to the forward and reverse operation of the spacing table. Accordingly, it is believed unnecessary to describe the operation of the apparatus in the reverse direction and this explanation will be omitted. Suffice it to say the relays RR and FPR operate in conjunction with the system when the carriage moves in the reverse direction in an identical manner as the relays FR and RPR, respectively, operate when controlling the movement of the carriage in the forward direction.

It is conceivable that the system will not come to a halt with a pin 130 blocking both light beams L1 and L2 upon the initial plugging and braking of the motor 66. It is possible that the inertia of the system will be such as to permit the carriage 50 to move sufficiently far in the forward direction to unblock the light beam emanating from the source L1 while still blocking the light beam emanating from L2. If this occurs, then photocell PH1 will be reactuated to energize relay PHR1 and thereby open the energizing circuit for relay ER1 which will release. Of course, relay PHR2 will be released whereby to energize relay ER2. Moreover, by the time the pin 130 has unblocked the light beam emanating from L1, relay TPR will finally pick up, its slow pick up time interval having expired. Accordingly, relay HR will release and relay LR will become energized and pick up. When the plugging and brake finally take effect to stop motor 66, plugging switch RPC will open and relay RPR will release to open the energizing circuit for relay RR which was theretofore closed. However, a new energizing circuit will be established for relay RR which may be traced from terminal BX, over back contact c of relay ER1 now released, front contact c of relay ER2, contact b of switch SS closed in the forward position, back contact a of relay FR, and the winding of relay RR to terminal NX. Accordingly, relay RR will remain picked up and will cause motor 66 to rotate in a reverse direction. The speed of rotation, however, will be low due to the fact that relay HR is now released and relay LR is picked up. Therefore, motor 66 will operate in the reverse direction at a low speed until the carriage is moved back to cause pin 130 to block the light beam emanating from source L1 as well as the light beam emanating from source L2. At this time relay RR will release and the motor will become deenergized and will stop due to the application of brake MB. Accordingly, the motor will stop with the pin blocking both light beams thereby insuring proper indexing of the carriage. In the unlikely event that the carriage again overshoots, whereby to unblock light beam L2 and to block light beam L1, then relay RR will release and relay FR will pick up to reenergize the motor in the forward direction but at low speed. This reenergization will continue until the pin again blocks the light beam emanating from L2 at which time the motor will become deenergized and stop with the carriage properly indexed and the pin 130 blocking both light beams L1 and L2.

It should be noted that during this oscillatory period that might occur, relay PTR becomes energized each time pin 130 intersects both light beams. However, due to its slow pick up characteristic, relay PTR does not pick up to energize the punch motor PM and the slow pick up time is sufficiently long to prevent the operation of relay PTR until the system has actually come to a stop whereby to insure that when the punch is operated it will strike the structural member at the proper spot.

It is believed obvious that if the spacing table were being operated in the reverse direction and tended to oscillate upon being stopped, the system would operate in substantially the identical manner. Accordingly, a detailed description of this phase of the operation of the apparatus is deemed unnecessary.

It is also believed obvious that the above described invention will operate satisfactorily if the pin support 124 were to be moved concomitantly with the carriage 50 and the photoelectric detecting means were fixedly positioned on or adjacent the spacing table. It is also believed clear to those skilled in the art that the relay circuits could be so arranged that the normally energized relays would be normally deenergized and the normally deenergized relays would be normally energized. Moreover, other circuit controlling means than relays could be employed in the present invention.

Moreover, it will be understood that the control means described and illustrated herein can be employed to position movable objects other than the carriage of a spacing table and particularly can be used to position objects that move in a predetermined path.

While there has been shown and described one form of the present invention and some changes and modifications therein have been suggested, it will be understood that various other changes and modifications may be made therein within the scope of the appended claims without departing from the spirit and scope of this invention.

Having now described my invention, what I claim as new and desire to secure by Letters Patent, is:

1. Means for positioning a movable object at a predetermined point, comprising a reversibly operable electric motor for moving said object; detecting means comprising photoelectric means and means for actuating said photoelectric means, said photoelectric means comprising first and second photocells and first and second lamps associated respectively therewith, said photoelectric means and said actuating means therefor being movable relative to one another concomitantly with the movement of said object, the path of said relative movement being such that said means for actuating said photoelectric device intersects the light beams emanating from both said first and second lamps when said object is at said predetermined point; means controlled by said photocells for energizing said motor in a forward direction when both said light beams are out of intersecting relationship with said photoelectric actuating means, means controlled by said photocells for energizing said motor in a reverse direction when the light beam emanating from said first lamp is intersected by said photoelectric actuating means and said second beam is out of intersecting relationship, and means controlled by said photocells for deenergizing said motor when both said light beams are intersected by said photoelectric actuating means.

2. Means for positioning a movable object at a predetermined point, comprising a reversibly operable two speed electric motor for moving said object; detecting means comprising photoelectric means and means for actuating said photoelectric means, said photoelectric means comprising first and second photocells and first and second lamps associated respectively therewith, said photoelectric means and said actuating means therefor being movable relative to one another concomitantly with the movement of said object, the path of said relative movement being such that said means for actuating said photoelectric device intersects the light beams emanating from both said first and second lamps when said object is at said predetermined point; means controlled by said photocells for energizing said motor in a forward direction and for high speed operation when both said light beams are out of intersecting relationship with said photoelectric actuating means, means controlled by said photocells for energizing said motor in a reverse direction and for high speed operation when the light beam emanating from said first lamp is intersected by said photoelectric actuating means and said second beam is out of intersecting relationship, means controlled by said photocells for energizing said motor for low speed operation and in a reverse direction when said photocell actuating means is out of intersecting relationship with said first light beam and in intersecting relationship with said second light beam, and means controlled by said photocells for deenergizing said motor when both said light beams are intersected by said photoelectric actuating means.

3. Means for positioning a movable object at a predetermined point, comprising a reversibly operable two speed electric motor for moving said object; detecting means comprising photoelectric means and means for actuating said photoelectric means, said photoelectric means comprising first and second photocells and first and second lamps associated respectively therewith, said photoelectric means and said actuating means therefor being movable relative to one another concomitantly with the movement of said object, the path of said relative movement being such that said means for actuating said photoelectric device intersects the light beams emanating from both said first and second lamps when said object is at said predetermined point, means controlled by said photocells for energizing said motor in a forward direction and for high speed operation when both said light beams are out of intersecting relationship with said photoelectric actuating means, means controlled by said photocells for energizing said motor in a reverse direction and for high speed operation when the light beam emanating from said first lamp is intersected by said photoelectric actuating means and said second beam is out of intersecting relationship, time delay means having a first or normal condition and a second condition which it assumes a predetermined time interval after being actuated, means controlled by said photocells for actuating said time delay means when said first light beam is in intersecting relationship with said photocell actuating means, means controlled by said photocells for energizing said motor for low speed operation and in a reverse direction when said photocell actuating means is out of intersecting relationship with said first light beam and in intersecting relationship with said second light beam and said time delay means is in said second condition, and means controlled by said photocells for deenergizing said motor when both said light beams are intersected by said photoelectric actuating means.

4. Means for positioning a movable object at a predetermined point, comprising a reversibly operable two speed electric motor for moving said object, said motor being a three phase, two speed motor wherein the speed is controlled at least in part by controlling the number of poles being energized, the direction of rotation of said motor being forward when the motor is energized in one phase sequence and the direction of rotation of said motor being reversed when the motor is energized in a different phase sequence, detecting means comprising photoelectric means and means for actuating said photoelectric means, said photoelectric means comprising first and second photocells and first and second lamps associated respectively therewith, said photoelectric means and said actuating means therefor being movable relative to one another concomitantly with the movement of said object, the path of said relative movement being such that said means for actuating said photoelectric means intersects the light beams emanating from both said first and second lamps when said object is at said predetermined point; means controlled by said photocells for energizing a given number of poles of said motor in said one phase sequence when both said light beams are out of intersecting relationship with said photoelectric actuating means whereby to operate said motor at relatively high speed in a forward direction to thereby move said object at high speed in a forward direction, means controlled by said photocells for energizing said given number of poles of said motor in said different phase sequence when the light beam emanating from said first lamp is intersected by said photoelectric actuating means and said second beam is out of intersecting relationship whereby to plug the motor to rapidly bring it to a halt and thereby stop the movement of said object, time delay means having a first or normal condition and a second condition which it assumes a predetermined time interval after being actuated, means controlled by said photocells for actuating said time delay means when said first light beam is in intersecting relationship with said photocell actuating means, means controlled by said photocells for energizing a multiple of said given number of poles of said motor in said different phase sequence when said photocell actuating means is out of intersecting relationship with said first light beam and in intersecting relationship with said second light beam and said time delay means is in said second condition whereby to slowly revolve said motor in a reverse direction to thereby move said object at low speed in a reverse direction, and means controlled by said photocells for deenergizing said motor when both said light beams are intersected by said photoelectric actuating means whereby to stop the operation of said motor and thereby stop said object at said predetermined point.

5. Means for positioning a movable object at a predetermined point, comprising a reversibly operable two speed electric motor for moving said object, said motor being a three phase, two speed motor wherein the speed is controlled by controlling the number of poles of said motor being energized, the direction of rotation of said motor being forward when the motor is energized in one phase sequence and the direction of rotation of said motor being reversed when the motor is energized in a different phase sequence, detecting means comprising photoelectric means and means for actuating said photoelectric means, said photoelectric means comprising first and second photocells and first and second lamps associated respectively therewith, said photoelectric means and said actuating means therefor being movable relative to one another concomitantly with the movement of said object, the path of said relative movement being such that said means for actuating said photoelectric means intersects the light beams emanating from both said first and second lamps when said object is at said predetermined point; means controlled by said photocells for energizing a given number of motor poles in said one phase sequence when both said light beams are out of intersecting relationship with said photoelectric actuating means whereby to operate said motor at relatively high speed in a forward direction to thereby move said object at high speed in a forward direction, means controlled by said photocells for energizing said given number of motor poles in said different phase sequence when the light beam emanating from said first lamp is intersected by said photoelectric actuating means and said second beam is out of intersecting relationship whereby to plug the motor to rapidly bring it to a halt and thereby stop the movement of said object, time delay means having a first or normal condition and a second condition which it assumes a predetermined time interval after being actuated, means controlled by sad photocells for actuating said time delay means when said first light beam is in intersecting relationship with said photocell actuating means, means controlled by said photocells for energizing a multiple of said given number of motor poles in said different phase sequence when said photocell actuating means is out of intersecting relationship with said first light beam and in intersecting relationship with said second light beam and said time delay means is in said second condition whereby to slowly revolve said motor in a reverse direction to thereby move said object at low speed in a reverse direction, and means controlled by said photocells for deenergizing said motor when both said light beams are intersected by said photoelectric actuating means whereby to stop the operation of said motor and thereby stop said object at said predetermined point.

6. Means for positioning a movable object at a predetermined point, comprising a reversibly operable electric motor for moving said object; detecting means comprising photoelectric means and a pin for actuating said photoelectric means, said photoelectric means comprising first and second photocells and first and second lamps associated respectively therewith, said lamps and photocells being arranged so that the light beams emanating from said first and second lamps intersect, said photoelectric means and said pin being movable relative to one another concomitantly with the movement of said object, the path of said relative movement being such that said pin intersects both said light beams at points other than the point at which said light beams intersect each other, said pin being of sufficient dimension in the direction of relative movement to block both light beams simultaneously, said object being positioned at said predetermined point when both said light beams are blocked by said pin, means controlled by said photocells for energizing said motor in a forward direction when both said light beams are out of intersecting relationship with said pin, means controlled by said photocells for energizing said motor in a reverse direction when the light beam emanating from said first lamp is intersected by said pin and said second beam is out of intersecting relationship therewith, and means controlled by said photocells for deenergizing said motor when both said light beams are intersected by said pin.

7. Means for positioning a movable object at a predetermined point, comprising a reversibly operable two speed electric motor for moving said object; detecting means comprising photoelectric means and a pin for actuating said photoelectric means, said photoelectric means comprising first and second photocells and first and second lamps associated respectively therewith, said lamps and photocells being arranged so that the light beams emanating from said first and second lamps intersect, said photoelectric means and said pin being movable relative to one another concomitantly with the movement of said object, the path of said relative movement being such that said pin intersects both said light beams at points other than the point at which said light beams intersect each other, said pin being of sufficient dimension in the direction of relative movement to block both light beams simultaneously, said object being positioned at said predetermined point when both said light beams are blocked by said pin, means controlled by said photocells for energizing said motor in a forward direction and for high speed operation when both said light beams are out of intersecting relationship with said pin, means controlled by said photocells for energizing said motor in a reverse direction and for high speed operation when the light beam emanating from said first lamp is intersected by said pin and said second beam is out of intersecting relationship therewith, time delay means having a first or normal condition and a second condition which it assumes a predetermined time interval after being actuated, means controlled by said photocells for actuating said time delay means when said first light beam is in intersecting relationship with said pin, means controlled by said photocells for energizing said motor for low speed operation and in a reverse direction when said pin is out of intersecting relationship with said first light beam and in intersecting relationship with said second light beam and said time delay means is in said second condition, and means controlled by said photocells for deenergizing and said motor when both said light beams are intersected by said pin.

8. Means for positioning a movable object at a predetermined point, comprising a reversibly operable two speed electric motor for moving said object; said motor being a three phase, two speed motor wherein the speed is controlled by controlling the number of motor poles being energized, the direction of rotation of said motor being forward when the motor is energized in one phase sequence and the direction of rotation of said motor being reversed when the motor is energized in a different phase sequence, detecting means comprising photoelectric means and a pin for actuating said photoelectric means, said photoelectric means comprising first and second photocells and first and second lamps associated respectively therewith, said lamps and photocells being arranged so that the light beams emanating from said first and second lamps intersect, said photoelectric means and said pin being movable relative to one another concomitantly with the movement of said object, the path of said relative movement being such that said pin intersects both said light beams at points other than the point at which said light beams intersect each other, said pin being of sufficient dimension in the direction of relative movement to block both light beams simultaneously, said object being positioned at said predetermined point when both said light beams are blocked by said pin, means controlled by said photocells for energizing a given number of poles of said motor in said one phase sequence when both said light beams are out of intersecting relationship with said pin whereby to operate said motor at relatively high speed in a forward direction to thereby move said object at high speed in a forward direction, means controlled by said photocells for energizing said given number of poles of said motor in said different phase sequence when the light beam emanating from said first lamp is intersected by said pin and said second beam is out of intersecting relationship therewith whereby to plug the motor to rapidly bring it to a halt and thereby stop the movement of said object, time delay means having a first or normal condition and a second condition which it assumes a predetermined time interval after being actuated, means controlled by said photocells for actuating said time delay means when said first light beam is in intersecting relationship with said pin, means controlled by said photocells for energizing a multiple of said given number of poles of said motor in said reversed phase sequence when said pin is out of intersecting relationship with said first light beam and in intersecting relationship with said second light beam and said time delay means is in said second condition whereby to slowly revolve said motor in a reverse direction to thereby move said object at low speed in a reverse direction, and means controlled by said photocells for deenergizing said motor when both said light beams are intersected by said pin whereby to stop the operation of said motor and thereby stop said object at said predetermined point.

9. Means for positioning a movable object at a predetermined point, comprising a reversibly operable two speed electric motor for moving said object; said motor being a three phase, two speed motor wherein the speed is controlled by controlling the number of motor poles being energized, the direction of rotation of said motor being forward when the motor is energized in one phase sequence and being reversed when the motor is energized in a different phase sequence, detecting means comprising photoelectric means and a pin for actuating said photoelectric means, said photoelectric means comprising first and second photocells and first and second lamps associated respectively therewith, said lamps and photocells being arranged so that the light beams emanating from said first and second lamps intersect, said photoelectric means and said pin being movable relative to one another concomitantly with the movement of said object, the path of said relative movement being such that said pin intersects both said light beams at points other than the point at which said light beams intersect each other, said pin being of sufficient dimension in the direction of relative movement to block both light beams simultaneously, said object being positioned at said predetermined point when both said light beams are blocked by said pin, manually operable means for selecting the direction of normal movement of said object and of the normal relative movement between said pin and said photoelectric means, said manually operable means having a first position, a second position and a third position, means controlled by said photocells and said manually operable means for energizing a given number of poles of said motor in said one phase sequence when said manually operable means is in said first position and both said light beams are out of intersecting relationship with said pin, whereby to operate said motor at relatively high speed in a forward direction, means controlled by said manually operable means and said photocells for energizing said given number of poles of said motor in said different phase sequence when said manually operable means is in said first position and the light beam emanating from said first lamp is intersected by said pin and said second beam is out of intersecting relationship with said pin whereby to plug the motor and thereby stop the movement of said object, time delay means having a normal condition and a second condition which it assumes a predetermined time interval after being actuated, a first means controlled by said photocells for actuating said time delay means when said first light beam is in intersecting relationship with said pin, a second means controlled by said photocells for actuating said time delay means when said second light beam is in intersecting relationship with said pin, means controlled by said time delay means, said photocells and said manually operable means for energizing a multiple of said given number of poles of said motor for low speed operation and in said reverse phase sequence when said manually operable means is in said first position and said photocell actuating means is out of intersecting relationship with said first light beam and in intersecting relationship with said second light beam and said time delay means is in said second condition whereby to slowly rotate said motor in a reverse direction to thereby move said object at low speed in a reverse direction, means controlled by said photocells and said manually operable means for energizing said given number of poles of said motor in said different phase sequence when said manually operable means is in said third position and both said light beams are out of intersecting relationship with said pin, whereby to operate said motor at high speed in a reverse direction to thereby move said object at high speed in a reverse direction, means controlled by said manually operable means and said photocells for energizing said given number of poles of said motor in said one phase sequence when said manually operable means is in said third position and the light beam emanating from said second lamp is intersected by said beam and said first beam is out of intersecting relationship with said pin whereby to plug the motor and thereby stop the movement of said object, means controlled by said manually operable means, said photocells and said time delay means for energizing said multiple of said given number of poles of said motor in said one phase sequence when said manually operable means is in said third position and said pin is out of intersecting relationship with said second light beam and in intersecting relationship with said first light beam and said time delay means is in said second condition whereby to slowly rotate said motor in a forward direction to thereby move said object at low speed in a forward direction, means controlled by said photocells for deenergizing said motor when both said light beams are intersected by said pin, and means for deenergizing said motor when said manually operable means is in said second position.

10. Means for positioning a movable object at a predetermined point, comprising a reversibly operable electric motor for moving said object; detecting means comprising photoelectric means and a pin for actuating said photoelectric means, said photoelectric means comprising first and second photocells and first and second lamps associated respectively therewith, said lamps and photocells being arranged so that the light beams emanating from said first and second lamps intersect, said photoelectric means and said pin being movable relative to one another concomitantly with the movement of said object, the path of said relative movement being such that said pin intersects both said light beams at points other than the point at which said light beams intersect each other, said pin being of sufficient dimension in the direction of relative movement to block both light beams simultaneously, said object being positioned at said predetermined point when both said light beams are blocked by said pin, first and second photocell repeater relays associated respectively with said first and second photocells, circuit means for energizing said first photocell repeater relay controlled by said first photocell and effective when said first photocell is illuminated by light from said first lamp, circuit means for energizing said second photocell repeater relay controlled by said second photocell and effective when said second photocell is illuminated by light from said second lamp, a slow pick up relay, circuit means for energizing said slow pick up relay controlled by said first photocell repeater relay and closed when the latter is energized, a low speed control relay, a high speed control relay, energizing circuit means for said low speed control relay controlled by said slow pick up relay and closed when the latter is picked up, energizing circuit means for said high speed control relay controlled by said slow pick up relay and closed when the latter is released, a plugging switch operatively connected to said motor and having a contact closed only when said motor is turning in the forward direction, a forward directional control relay, a first circuit means for energizing said forward directional control relay controlled by said first and second photocell repeater relays and closed only when both said relays are energized, a reverse directional control relay, a first energizing circuit means for said reverse directional control relay controlled by said contact of said plugging switch and closed only when said plugging switch contact is closed, a second energizing circuit means for said reverse directional control relay controlled by said first and second photocell repeater relays and closed only when said first photocell repeater relay is energized and said second photocell repeater relay is deenergized, said forward and reverse directional control relays being interlocked whereby to prevent simultaneous energizing thereof, circuit means for energizing said motor for forward rotation at high speed controlled by said forward directional control relay and said high speed control relay and closed when both said relays are energized, circuit means for plugging said motor to stop it controlled by said reverse directional control relay and said high speed control relay and closed when both said relays are energized, and circuit means for operating said motor in a reverse direction at low speed controlled by said reverse directional control relay and said low speed control relay and closed when both said relays are energized, said motor being deenergized when both said forward and reverse directional control relays are deenergized.

11. Means for positioning a movable object at a predetermined point, comprising a reversibly operable electric motor for moving said object; detecting means comprising photoelectric means and a pin for actuating said photoelectric means, said photoelectric means comprising first and second photocells and first and second lamps associated respectively therewith, said lamps and photocells being arranged so that the light beams emanating from said first and second lamps intersect, said photoelectric means and said pin being movable relative to one another concomitantly with the movement of said object, the path of said relative movemnet being such that said pin intersects both said light beams at points other than the point at which said light beams intersect each other, said pin being of sufficient dimension in the direction of relative movement to block both light beams simultaneously, said object being positioned at said predetermined point when both said light beams are blocked by said pin, manually operable means having a first or forward position, a second or off position and a third or reverse position, first and second photocell repeater relays associated respectively with said first and second photocells, circuit means for energizing said first photocell repeater relay controlled by said first photocell and effective when said first photocell is illuminated by light from said first lamp, circuit means for energizing said second photocell repeater relay controlled by said second photocell and effective when said second photocell is illuminated by light from said second lamp, a slow pick up relay, circuit means for energizing said slow pick up relay controlled by said first photocell repeater relay and closed when the latter is deenergized, second circuit means for energizing said slow pick up relay controlled by said second photocell repeater relay and closed when the latter is deenergized, a low speed control relay, a high speed control relay, energizing circuit means for said low speed control relay controlled by said slow pick up relay and closed when the latter is picked up, energizing circuit means for said high speed control relay controlled by said slow pick up relay and closed when the latter is released, a plugging switch operatively connected to said motor and having a first contact closed only when said motor is turning in the forward direction and having a second contact closed only when said motor is turning in the reverse direction, a forward directional control relay, a first circuit means for energizing said forward directional control relay controlled by said first and second photocell repeater relays and said manually operable means and closed only when both said photocell repeater relays are energized and said manually operable means is in said first position, a third energizing circuit controlling means for said forward directional control relay controlled by said first and second photocell repeater relays and said manually operable means and closed only when said first photocell repeater relay is deenergized and said second photocell repeater relay is energized and said manually operable means is in said third position, a second energizing circuit for said forward directional control relay controlled by said second contact of said plugging switch and closed only when said second contact of said plugging switch is closed, a reverse directional control relay, a first energizing circuit means for said reverse directional control relay controlled by said first contact of said plugging switch and closed only when said first contact of said plugging switch is closed, a second energizing circuit for said reverse directional control relay controlled by said manually operable means and said first and second photocell repeater relays and closed only when said manually operable means is in said third position and both said photocell repeater relays are energized, a third energizing circuit means for said reverse directional control relay controlled by said first and second photocell repeater relays and said manually operable means and closed only when said first photocell repeater relay is energized and said second photocell repeater relay is deenergized and said manually operable means is in said first position, said forward and revrese directional control relays being interlocked whereby to prevent simultaneous energizing thereof, circuit means for energizing said motor for forward rotation at high speed controlled by said forward directional control relay and said high speed control relay and closed when both said relays are energized, circuit means for energizing said motor for forward rotation at low speed controlled by said forward directional control relay and said low speed control relay and closed when both said relays are energized, circuit means for energizing said motor for high speed rotation in the reverse direction controlled by said reverse directional control relay and said high speed control relay and closed when both said relays are energized, circuit means for energizing said motor for low speed rotation in said reverse direction controlled by said reverse directional control relay and said low speed control relay and closed when both said relays are energized, said motor being deenergized when both said forward and reverse directional relays are deenergized.

12. Means for positioning a movable object at a predetermined point, comprising a reversibly operable two speed electric motor for moving said object; said motor being a three phase, two speed motor wherein the speed is controlled by controlling the number of poles being energized, the direction of rotation of said motor being forward when the motor is energized in one phase sequence and the direction of rotation of said motor being reversed when the motor is energized in a different phase sequence, detecting means comprising photoelectric means and a pin for actuating said photoelectric means, said photoelectric means comprising first and second photocells and first and second lamps associated respectively therewith, said lamps and photocells being arranged so that the light beams emanating from said first and second lamps intersect, said photoelectric means and said pin being movable relative to one another concomitantly with the movement of said object, the path of said relative movement being such that said pin intersects both said light beams at points other than the point at which said light beams intersect each other, said pin being of sufficient dimension in the direction of relative movement to block both light beams simultaneously said object being positioned at said predetermined point when both said light beams are blocked by said pin, a manually operable switch for selecting the direction of normal movement of said object and of the normal relative movement between said pin and said photoelectric means, said manually operable switch having a first or forward position, a second or off position and a third or reverse position, first and second repeater relays associated with said first and second photocells, respectively, circuit means for energizing said first repeater relay closed when light emanating from said first lamp falls on said first photocell, circuit means for energizing said second repeater relay closed when light emanating from said second lamp falls on said second photocell, first and second reverse repeater relays associated with said first and second repeater relays, respectively, an energizing circuit for said first reverse repeater relay including a back contact of said first repeater relay, an energizing circuit for said second reverse repeater relay including a back contact of said second repeater relay, a first push button switch having a normally open position and being operable to a closed position, a control relay, a first energizing circuit for said control relay controlled by said first push button switch and closed when said first push button switch is closed, a first stick circuit for said control relay including a front contact of said first reverse repeater relay, a second stick relay for said control relay including a front contact of said second reverse repeater relay, a slow pick up relay, a first circuit for energizing said slow pick up relay including a front contact of said reverse repeater relay and a back contact of said control relay, a second circuit for energizing said slow pick up relay including a front contact of said second reverse repeater relay and a back contact of said control relay, a low speed control relay, a high speed control relay, a circuit for energizing said high speed control relay including a back contact of said slow pick up relay and a back contact of said low speed control relay, a circuit for energizing said low speed control relay including a front contact of said slow pick up relay and a back contact of said high speed relay, a plugging switch operatively connected to said motor shaft and having a first contact closed only when said motor operates in a reverse direction and a second contact closed only when said motor operates in a forward direction, a forward plugging relay, a circuit for energizing said forward plugging relay including said first contact of said plugging switch, a reverse plugging relay, a circuit for energizing said reverse plugging relay including said second contact of said plugging switch, a forward directional control relay, a reverse directional control control relay, a first circuit for energizing said forward directional control relay including a back contact of said first repeater relay, a back contact of said second reverse repeater relay, a contact of said manually operable switch closed in the forward position thereof, and a back contact of said reverse directional control relay, a second energizing circuit for said forward control relay including a front contact of said forward plugging relay and a back contact of said reverse repeater relay, a third circuit for energizing said forward directional relay including a front contact of said control relay, a contact of said manually operable switch closed in said forward direction, and a back contact of said reverse directional control relay, a fourth energizing circuit for said forward directional control relay including a back contact of said second reverse repeater relay, a front contact of said first reverse repeater relay, a contact of said manually operable switch closed in the reverse position thereof and a back contact of said reverse directional control relay, a first energizing circuit for said reverse directional control relay including a back contact of said second reverse repeater relay, a back contact of said first reverse repeater relay, a contact of said manually operable switch closed in the reverse position thereof, and a back contact of said forward directional control relay, a second energizing circuit for said reverse directional control relay including a front contact of said reverse plugging relay and a back contact of said forward directional control relay, a third energizing circuit for said reverse directional control relay including a front contact of said control relay, a contact of said manually operable switch closed in the reverse direction thereof, and a back contact of said forward directional control relay, a fourth energizing circuit for said reverse directional control relay including a back contact of said first reverse repeater relay, a front contact of said second reverse repeater relay, a contact of said manually operable switch closed in the forward position thereof and a back contact of said forward directional control relay, a brake for said movable object, a brake solenoid operatively connected to said brake for operating the latter, said brake being applied when said brake solenoid is deenergized, a brake relay for energizing said brake solenoid including a back contact of said brake relay, a brake stick relay, a circuit for energizing said brake relay including a front contact of said brake stick relay, a first energizing circuit for said brake stick relay including a front contact of said forward directional control relay, a back contact of said reverse plugging relay and a back contact of said forward plugging relay, a second energizing circuit for said brake stick relay including a front contact of said reverse directional control relay, a back contact of said reverse plugging relay and a back contact of said forward plugging relay, a first stick circuit for said brake stick relay including a front contact of said forward directional control relay, a second stick circuit for said brake stick relay including a front contact of said reverse directional control relay, an energizing circuit means for supplying a given number of poles of said motor with electric energy in said one phase sequence including a front contact of said forward directional control relay and a front contact of said high speed relay, circuit means for energizing a multiple of said given number of poles of said motor in said one phase sequence including a front contact of said forward directional relay and a front contact of said low speed relay, circuit means for supplying said given number of poles of said motor with energy in said different phase sequence including a front contact of said reverse directional control relay and a front contact of said high speed relay, and circuit means for energizing said multiple of said given number of poles of said motor in said different phase sequence including a front contact of said reverse directional control relay and a front contact of said low speed relay.

References Cited in the file of this patent

UNITED STATES PATENTS

| | | |
|---|---|---|
| 1,652,095 | Coombes | Dec. 6, 1927 |
| 1,814,890 | Biagosch | July 14, 1931 |
| 1,876,650 | Farmer | Sept. 13, 1932 |
| 2,406,299 | Koulicovitch | Aug. 20, 1946 |
| 2,474,380 | Simmon | June 28, 1949 |
| 2,578,960 | Alger | Dec. 18, 1951 |
| 2,581,937 | Secrest | Jan. 8, 1952 |
| 2,617,483 | Porter | Nov. 11, 1952 |
| 2,628,680 | Seybold | Feb. 17, 1953 |
| 2,649,155 | Spiller | Aug. 18, 1953 |
| 2,737,158 | Seybold et al. | Mar. 6, 1956 |